(12) United States Patent
Zhao

(10) Patent No.: US 12,235,779 B2
(45) Date of Patent: Feb. 25, 2025

(54) TIME-SENSITIVE NETWORK SWITCH

(71) Applicant: ZHEJIANG LAB, Zhejiang (CN)

(72) Inventor: Xuyang Zhao, Zhejiang (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/041,790

(22) PCT Filed: Dec. 15, 2022

(86) PCT No.: PCT/CN2022/139287
§ 371 (c)(1),
(2) Date: Feb. 15, 2023

(87) PCT Pub. No.: WO2023/155578
PCT Pub. Date: Aug. 24, 2023

(65) Prior Publication Data
US 2024/0281392 A1 Aug. 22, 2024

(30) Foreign Application Priority Data
Feb. 18, 2022 (CN) .......................... 202210148318.9

(51) Int. Cl.
G06F 9/54 (2006.01)
G06F 13/28 (2006.01)

(52) U.S. Cl.
CPC .............. G06F 13/28 (2013.01); G06F 9/546 (2013.01)

(58) Field of Classification Search
None
See application file for complete search history.

(56) References Cited

U.S. PATENT DOCUMENTS 9,280,290 B2 * 3/2016 Feehrer ................. G06F 3/0635
9,288,157 B2 * 3/2016 Chandhoke ........... H04L 47/805
(Continued)

FOREIGN PATENT DOCUMENTS

CN 103838552 A 6/2014
CN 106371925 A 2/2017
(Continued)

OTHER PUBLICATIONS

ISA State Intellectual Property Office of the People's Republic of China, International Search Report Issued in Application No. PCT/CN2022/139287, Feb. 14, 2023, WIPO, 6 pages.
(Continued)

Primary Examiner — Elias Mamo
(74) Attorney, Agent, or Firm — McCoy Russell LLP

(57) ABSTRACT

The present disclosure discloses a time-sensitive network switch including a plurality of multi-core CPUs. In the time-sensitive network switch, by the parallel data processing method with multi-core system-on-chips (SoC), industrial real-time data are distributed to multi-core SoCs for processing in parallel. The processed data are scheduled according to the identified priority, and are arranged to the different priority queues of the port in order to process the high-priority data first, which reduces the processing time for the data in the device. The data passes through the security encryption engine in the time-sensitive network switch, which ensures the security for processing data in the device. The reliability, real-time and stability of the data transmission in the time-sensitive network are improved.

8 Claims, 2 Drawing Sheets

(56) References Cited

U.S. PATENT DOCUMENTS

| | | | |
|---|---|---|---|
| 10,805,205 B2* | 10/2020 | Mehmedagic | H04L 45/42 |
| 10,997,106 B1 | 5/2021 | Bandaru et al. | |
| 11,184,439 B2* | 11/2021 | Eran | H04L 67/10 |
| 11,354,256 B2* | 6/2022 | Xiang | G06F 13/4068 |
| 2011/0035751 A1* | 2/2011 | Krishnakumar | G06F 9/4881 |
| | | | 718/103 |
| 2015/0103828 A1 | 4/2015 | Chandhoke et al. | |
| 2015/0324234 A1* | 11/2015 | Chang | G06F 9/5033 |
| | | | 718/104 |
| 2019/0121781 A1 | 4/2019 | Kasichainula | |
| 2021/0014177 A1* | 1/2021 | Kasichainula | H04L 47/6295 |

FOREIGN PATENT DOCUMENTS

| | | | |
|---|---|---|---|
| CN | 109787919 A | 5/2019 | |
| CN | 110892380 A | 3/2020 | |
| CN | 111404818 A | 7/2020 | |
| CN | 112105080 A | 12/2020 | |
| CN | 112769785 A | 5/2021 | |
| CN | 112804297 A | 5/2021 | |
| CN | 113300800 A | 8/2021 | |
| CN | 113312299 A | 8/2021 | |
| CN | 113795826 A | 12/2021 | |
| CN | 114201427 A | 3/2022 | |
| WO | 2008121690 A2 | 10/2008 | |

OTHER PUBLICATIONS

ISA State Intellectual Property Office of the People's Republic of China, Written Opinion of the International Searching Authority Issued in Application No. PCT/CN2022/139287, Feb. 14, 2023, WIPO, 8 pages.

Zhao, L., "Design Framework of Network Processor Oriented Data-plane Software," Computer Engineering, vol. 32 No. 6, Mar. 20, 2006, 4 pages.

Liu, J. et al., "The Development and the Software System Architecture of Multi-core Multi-threading Processor," Microprocessors, No. 1, Feb. 28, 2007, 4 pages.

Wang, Z. et al., "Design and Implementation of Multicore-based Security Gateway," Information Security and Communication Privacy, Jun. 10, 2009, 4 pages.

Yang, Q. et al., "Design and implementation of IPS based on multi-Core," Computer Engineering and Design 2010, vol. 31, No. 21, Nov. 16, 2010, 4 pages.

Zhang, S. et al., "Survey on Scalability of Control Plane in Software-Defined Networking," Journal of Software, Jul. 12, 2017, 16 pages.

Shang, Q. et al., "A Scalability Decoupling Design for Multi-Core Network Protocol Stack," Journal of Network New Media, vol. 6 No. 5, Sep. 15, 2017, 5 pages.

State Intellectual Property Office of the People's Republic of China, Office Action and Search Report Issued in Application No. 202210148318.9, Apr. 2, 2022, 21 pages. (Submitted with Machine/Partial Translation).

* cited by examiner

TIME-SENSITIVE NETWORK SWITCH

CROSS REFERENCE TO RELATED APPLICATION

This application is a US National Phase of a PCT Application No. PCT/CN2022/139287 filed on Dec. 15, 2022, which claims priority to Chinese Patent Application No. 202210148318.9 filed on Feb. 18, 2022, the entire contents of which are incorporated herein by reference in their entireties.

TECHNICAL FIELD

The present disclosure relates to the technical field of data transmission in time-sensitive networks of industrial control systems, in particular to time-sensitive network switches.

BACKGROUND

The traditional industrial control system generally uses a single-core processor with low performance. According to data operation mode with single-core and single-thread, the collected industrial data are analyzed, processed and controlled successively. Because the data stream is controlled by hardware, the processing ability of key data is poor, and the data scheduling ability is lacking. The data transmission of traditional industrial field-level devices is based on Quality of Service (QoS), which cannot achieve real-time data transmission, and the reliability of data transmission is low. As more and more devices are accessed in the site level, available bandwidth limitation and the coexistence of different flow types have become important issues in the factory backbone network channel. When time-critical flow and conventional flow share the same network infrastructure, processing mechanism with the single-core and single-thread data is difficult to satisfy the requirements of modern industrial technology development.

SUMMARY

According to a first aspect of the present disclosure, a time-sensitive network switch including a plurality of multi-core CPUs is provided, and the time-sensitive switch is configured to:
  in response to receiving data through a physical transmission medium of the time-sensitive network switch, determine a target multi-core CPU in the plurality of multi-core CPUs;
  wherein, the target multi-core CPU is configured to: determine, in response to receiving the data, time-sensitive data and non-time-sensitive data from the data; determine a first buffer for storing the time-sensitive data and a second buffer for storing the non-time-sensitive data, in a cache resource pool of the time-sensitive network switch; identify a priority of the time-sensitive data to allocate the time-sensitive data into a queue at a first port of the time-sensitive network switch to be waiting for transmission;
  wherein, the time-sensitive network switch further includes a DMA controller, configured to output the non-time-sensitive data from a second port of the time-sensitive network switch by the DMA controller.

In some embodiments, in response to receiving data through the physical medium of the time-sensitive network switch, determining the target multi-core CPU in the plurality of multi-core CPUs includes: according to QoS requirements of the data and a configuration file defaulted by a user, determining the target multi-core CPU in the plurality of multi-core CPUs.

In some embodiments, after identifying the priority of the time-sensitive data, the target multi-core CPU is further configured to: determine an idle core in the target multi-core CPU; enable the idle core to process time-sensitive data with high priority to realize the accelerated processing for the time-sensitive data with high priority.

In some embodiments, after receiving the data, and before determining the time-sensitive data and the non-time-sensitive data from the data, the target multi-core CPU is further configured to: verify for the received data; where, determining the time-sensitive data and non-time-sensitive data from the data includes: determining the time-sensitive data and non-time-sensitive data from the data in response to a successful verification.

In some embodiments, identifying the priority of the time-sensitive data to allocate the time-sensitive data into the queue at the first port of the time-sensitive network switch to be waiting for transmission includes: according to the priority of the time-sensitive data, establish a function library and a driver set to solve a port queue scheduling scheme for the time-sensitive data; according to the port queue scheduling scheme, allocate the time-sensitive data into the queue at the first port of the time-sensitive network switch to be waiting for transmission.

In some embodiments, the DMA controller is configured to perform port-to-port pass-through transmission for the non-time-sensitive data.

In some embodiments, the target multi-core CPU is further configured to: monitor abnormal flows through ports and prevent abnormal data attacks at the ports.

In some embodiments, each multi-core CPU is configured with L1 cache, L2 cache and SDRAM, wherein the L1 cache includes an instruction cache area and a data cache area; the L2 cache is configured to cache data to be processed; in response to determining that the first buffer for storing the time-sensitive data and the second buffer for storing the non-time-sensitive data cannot be determined in the cache resource pool, the target multi-core CPU is further configured to: establish a third buffer for storing the time-sensitive data in the SDRAM; and establish a fourth buffer for storing the non-time-sensitive data in the SDRAM.

According to a second aspect of the present disclosure, a time-sensitive network switch is provided, where the time-sensitive network switch includes:
  a plurality of multi-core CPUs;
  a plurality of data traffic planes, where each data traffic plane includes a DMA controller, a cache resource pool coupled with the DMA controller, and a plurality of physical transmission media coupled with the cache resource pool;
  a data management plane, where the data management plane is configured to manage the plurality of data traffic planes;
  an internal interconnect bus, wherein the data management plane and the plurality of data traffic planes are coupled with the plurality of multi-core CPUs through the internal interconnect bus;
  wherein, in response to receiving data through a physical transmission medium, the time-sensitive network switch is configured to:
  determine, through the internal interconnect bus, a target multi-core CPU for processing the data in the plurality of multi-core CPUs; determine, through the target multi-core CPU, time-sensitive data and non-timesensitive data from the data based on the data management plane; determine, through the target multi-core CPU, a first buffer for storing the time-sensitive data and a second buffer for storing the non-time-sensitive data, in the cache resource pool based on the data management plane; identify, through the target multi-core CPU, a priority of the time-sensitive data based on the data management plane, to allocate, through the data traffic plane corresponding to the physical transmission medium, the time-sensitive data into a queue at a first port of the time-sensitive network switch to be waiting for transmission; and output, by the DMA controller in the data traffic plane corresponding to the physical transmission medium, the non-time sensitive data from a second port of the time sensitive network switch.

The time-sensitive network switch provided according to the embodiment of the present disclosure can process time-sensitive data in parallel. The time-sensitive network switch can check the inlet flow through the optical interface or electrical interface, and extract the user-defined flow from the port flow. Then the specific flow (or related flow) is guided to a specific core or group of cores, and the real-time, reliability and stability of data transmission is realized through organised management.

DETAILED DESCRIPTION OF THE EMBODIMENTS

The technical solution in the embodiments of the present disclosure will be described clearly and completely in combination with the drawings in the embodiments of the present disclosure. Obviously, the described embodiments are only part of the embodiments of the present disclosure, not all of them.

The development of the Industrial Internet of Things (IIoT) has encountered various dilemmas. With the increasing number of industrial field-level environmental devices, the data throughput is increasing. The traditional industrial controller mainly relies on data processing mode with the single-core and single-thread for data processing, and the data processing speed is difficult to meet the improvement of production efficiency. The processing device with multi-core has a problem of low efficiency for data processing. The sequential processing mode causes the cores of CPU (Central Processing Unit) resource waste, and the multi-core parallel operation has the problem of data processing disorder.

Figure 1:
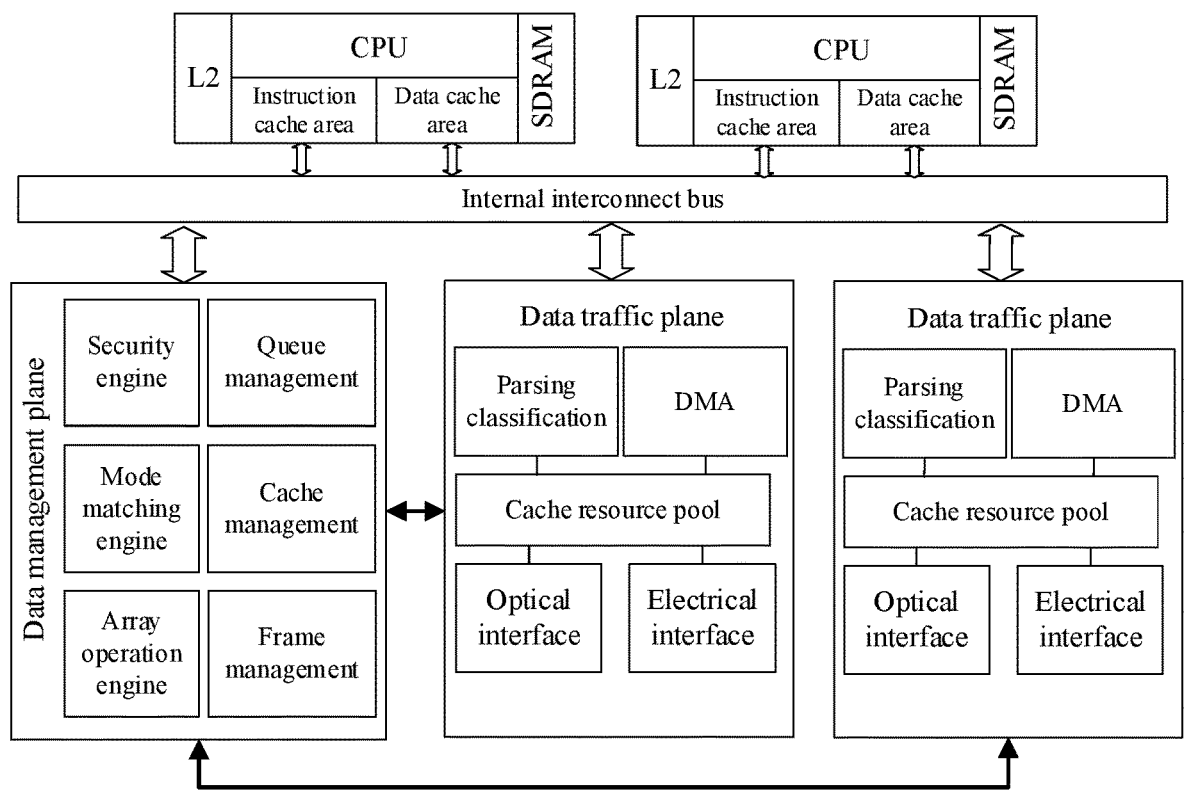
FIG. 1 is a structural diagram of a time-sensitive network switch according to some embodiments of the present disclosure.

As shown in FIG. 1, an embodiment of the present disclosure provides a time-sensitive network switch, including a plurality of multi-core CPUs, multiple data traffic planes and a data management plane. The multi-core CPUs and the data traffic planes, the multi-core CPUs and the data management plane, are connected interactively by the internal interconnect bus. The data management plane controls the data traffic planes and defines a target multi-core CPU and an interaction mode of data structure, and thus packets can be moved through the offload engine and outbound network interface with minimal CPU overhead. The outbound network interface includes the optical interface or electrical interface shown in FIG. 1. Multi-core CPUs can also be called multi-core system-on-chips.

The multi-core CPU is configured to provide the parallel processing core for time-sensitive data, share the data traffic plane through the internal interconnect bus, and perform parallel computing and processing for time-sensitive data. There are L1 cache and L2 cache in the multi-core CPU, and L1 cache includes an instruction cache area and a data cache area. The time-sensitive data are processed in parallel by multi-core CPU, and the data to be processed are cached by L2 cache to reduce the processing time for time-sensitive data in the time-sensitive network switch and ensure the accuracy of transmission time for time-sensitive data.

The data traffic plane is configured to provide the processing and forwarding function for the data interaction on the input link and the output link. The data traffic plane includes the parsing classification module, Direct Memory Access (DMA) controller, cache resource pool, optical interface and electrical interface. For the received time-sensitive data, the multi-core CPU can calculate the transmission priority of the time-sensitive data (which can be referred to as priority and marked in the vlan-tag field). In some embodiments, the priority of the time-sensitive data can include eight categories, which are 0, 1, 2, 3, 4, 5, 6, 7. If the multi-core CPU calculates the priority of the time-sensitive data is 0, the multi-core CPU can send the priority 0 of the time-sensitive data to the parsing classification module in the data traffic plane. The parsing classification module can put the time-sensitive data into the queue whose priority is 0 in the cache resource pool to wait for transmission scheduling, thereby greatly improving the data processing performance and throughput. For non-time-sensitive data, the DMA controller provides a port-to-port non-time-sensitive data pass-through transmission mechanism to directly look up the destination address and source address of non-time-sensitive data for data exchange.

The cache resource pool is configured to store the data received or to be sent by the port to avoid the loss of data packet caused by data congestion at the port. The cache resource pool increases the data cache capacity of large throughput by improving the data storage space at the port to avoid data loss caused by port congestion.

Parsing classification module is configured to, based on the priority category of time-sensitive network data frames, allocate the data to different levels of queues to be waiting for transmission scheduling according to the priority, and establish the function library and driver set for fast packet processing, thereby greatly improving the data processing performance and throughput.

The data management plane is configured to establish security mechanism, resource scheduling, cache share, and comprehensive optimization and analysis on reliability, and calculation configuration management for the data traffic plane. Through the management for the data traffic plane, multiple cores planning and parallel processing are realized. The data management plane includes security engine, queue management, mode matching engine, cache management, array operation engine, and frame management.

The security engine provides functions, such as, security guidance, code integrity protection during running and session key protection for time-sensitive data, and includes monitoring abnormal traffic at ports and preventing abnormal data attacks at ports. The security engine also provides the data security processing mechanism for the entire time-sensitive network switch. By checking the integrity of the running code and encrypting the data communication, the security performance of the time-sensitive network switch is improved, for example, the port congestion caused by DDos attacks and abnormal burst traffic can be effectively prevented.

The array operation engine uses technologies data striping, mirroring and data verification to obtain high performance, reliability, fault tolerance and scalability. In addition, if multiple pieces of data are received at the same time, the array operation engine can distribute these data to different multi-core CPUs for processing according to the data QoS requirements and configuration files defaulted by users. The internal interconnect bus adopts AMBA NIC bus, which provides high-speed data interactive connection, improves the processing efficiency for time-sensitive data in the switch, and improves the data transmission efficiency by using parallel bus. Array operation engine mainly solves the problem of data loss and high bit error rate caused by the disorder of time-sensitive data in parallel processing mechanism.

The cache management is configured to manage the cache resource pool. The frame management is configured to determine the time-sensitive data frames and non-time-sensitive data frames in the received data frames, and request one or more buffers from the cache management to store the received data frames. In some embodiments, the frame management can ask the cache management to offer a first buffer from the cache resource pool to store time-sensitive data frames, and a second buffer from the cache resource pool to store non-time-sensitive data frames. If an appropriate buffer cannot be configured for time-sensitive data frames or non-time-sensitive data frames from the cache resource pool, the mode matching engine provides automatic scanning for data from the data stream to find a mode that matches the specifications in the synchronous dynamic random-access memory (SDRAM) of the multi-core CPU, including the supported byte length and data checking method, to establish a third buffer for storing time-sensitive data frames and a fourth buffer for storing non-time-sensitive data frames in SDRAM. The frame management can send a queue request command to the queue management. The queue request command includes the frame management ID and the priority parameter of the data frame calculated by the multi-core CPU. The queue management can use the frame management ID to guide the time-sensitive data to different CPU cores in the multi-core CPU corresponding to the time-sensitive data through the internal interconnect bus. For example, the frame management ID parameter can be configured as 0 or 1, which is used to guide the time-sensitive data into the corresponding CPU core. According to the frame management ID and the priority parameters, the time-sensitive data are allocated to different CPU cores in the multi-core CPU. For example, the data with frame management ID 1 and priority parameters 4-7 are allocated to core 1 in the multi-core CPU for processing, and the data with frame management ID 0 and priority parameters 0-3 are allocated to core 2 in the multi-core CPU for processing.

In the time-sensitive network switch, by the parallel data processing method with multi-core system-on-chips (SoC), industrial real-time data are distributed to multi-core SoCs for processing in parallel. The processed data are scheduled according to the identified priority, and are arranged to the different priority queues of the port in order to process the high-priority data first, which reduces the processing time for the data in the device. The data passes through the security encryption engine in the time-sensitive network switch, which ensures the security for processing data in the device. The reliability, real-time and stability of the data transmission in the time-sensitive network are improved.

In some embodiments, the present disclosure provides a time-sensitive network switch including a plurality of multi-core CPUs, which is configured to:
  in response to receiving data through a physical transmission medium of the time-sensitive network switch, determine a target multi-core CPU in the multi-core CPUs;
  where, the target multi-core CPU is configured to: determine, in response to receiving the data, time-sensitive data and non-time-sensitive data from the data; determine a first buffer for storing the time-sensitive data and a second buffer for storing the non-time-sensitive data, in a cache resource pool of the time-sensitive network switch; and identify a priority of the time-sensitive data to allocate the time-sensitive data into a queue at a first port of the time-sensitive network switch to be waiting for transmission; where, the time-sensitive network switch further includes a DMA controller, configured to output the non-time-sensitive data from a second port of the time-sensitive network switch by the DMA controller.

In order to better understand the time-sensitive network switch provided by the embodiment of the disclosure, the present disclosure also provides a data scheduling process for a time-sensitive data parallel processing method, which includes the following steps:
  the data arrives at the time-sensitive network switch through physical transmission media such as optical interface and electrical interface. The data are cached in the cache resource pool for storage. For the data that need to be directly exchanged and processed, the data are directly scheduled from the corresponding port through the DMA controller. For the time-sensitive data that need to be forwarded, the priority of the data and forwarding scheduling ports for the data are identified by the parsing classification module. The time-sensitive data passed through the parsing classification module can be processed according to the functions of the security engine, queue management, mode matching engine, cache management, array operation engine and frame management in the data management plane in order, and the multi-core CPU can calculate the time-sensitive data according to the functions of the modules. The processed time-sensitive data can be forwarded to the corresponding output port, and the data are allocated into the corresponding transmission queue to be waiting for transmission according to the priority of the parsed data by the parsing classification module.

The data scheduling process will be further described in combination with specific embodiments.

The multi-core CPU performs traversal and retrieval for data packets at the optical interface or electrical interface in the time-sensitive network switch, and performs data processing on the received data, for example, according to data processing according to the functions of security engine, queue management, mode matching engine, cache management, array operation engine, and frame management in the data management plane. For non-time-sensitive data, the data are directly dispatched to the corresponding output port through the DMA controller for processing; frame management requests one or more buffers from cache management to store data frames. The cache management manages the cache resource pool, which has the characteristics defined by the software. The frame management requests the buffer from the cache resource pool. If an appropriate buffer cannot be configured for data frames, the mode matching engine provides automatic scanning for data from the data stream to find a mode that matches the specifications in the SDRAM, including the supported byte length and data checking method. Cache management provides a shared resource pool, supports buffers with different sizes and different memory, and prevents data loss caused by port congestion. Through frame management, data frames are stored in several smaller buffers, and scatter/collection list for the buffers is created.

Frame management can be configured with parsing and archiving functions. The frame management can perform data frame classification to determine time-sensitive data and non-time sensitive data, and guide time-sensitive data to different cores in multi-core CPU. The data streams are classified mainly based on the QoS attributes of the stream (for example, Differential Services Code Point (DSCP), IP priority, or user-defined proprietary headers), so that time-sensitive data are guided to different cores of a multi-core CPU.

The time-sensitive data are guided to different cores of the multi-core CPU through the queue request command sent to the queue management by the frame management. The command includes the specified frame management ID and data parameters, such as frame management ID and priority parameters. The queue management uses the frame management ID to guide the time-sensitive data to the dedicated lane of CPU #1 (core 1 of multi-core CPU) or CPU #2 (core 2 of multi-core CPU) through the internal interconnect bus. The corresponding multi-core CPU can be selected for data processing according to the QoS requirements of data frames and user profiles.

Through user-defined load balancing and fine-grained classification of data, the idle CPU core in CPU cores is selected to process high-level data frames to realize the accelerated processing for time-sensitive data.

After accelerating the data processing, the security engine encrypts the time-sensitive data. The array operation engine uses data striping, mirroring and data verification technology to copy and transmit the processed time-sensitive data to improve data transmission reliability and scalability.

Figure 2:
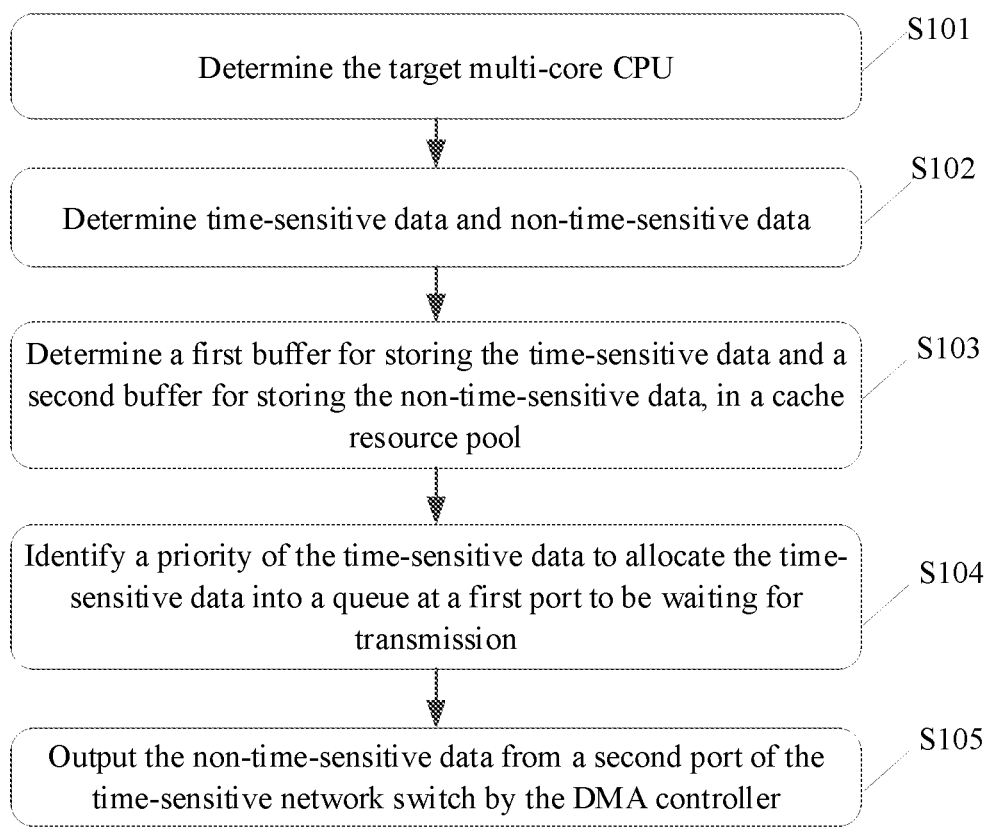
FIG. 2 is a flowchart of data transmission by a time-sensitive network switch according to some embodiments of the present disclosure.

In some embodiments, the present disclosure also provides a flow chart for data transmission by using the time-sensitive network switch shown in FIG. 1. As shown in FIG. 2, the data transmission process includes steps S101-S105.

At step 101, in response to receiving data through a physical transmission medium of the time-sensitive network switch, a target multi-core CPU in the multi-core CPUs is determined. In some embodiments, the target multi-core CPU for processing the data in the multi-core CPUs can be determined by the internal interconnect bus.

At step 102, in response to receiving the data, the target multi-core CPU determines time-sensitive data and non-time-sensitive data from the data.

At step 103, the target multi-core CPU determines a first buffer for storing the time-sensitive data and a second buffer for storing the non-time-sensitive data, in a cache resource pool of the time-sensitive network switch.

At step 104, the target multi-core CPU identifies a priority of the time-sensitive data to allocate the time-sensitive data into a queue at a first port of the time-sensitive network switch to be waiting for transmission.

At step 105, the non-time-sensitive data from a second port of the time-sensitive network switch are output by the DMA controller.

What has been described above is merely some preferred embodiments of the present disclosure. However, the scope of the disclosure is not limited thereto. Within the technical scope disclosed by the disclosure, equivalent changes or modifications according to the technical solution of the disclosure and its concept made by any person skilled in the art are intended to covered in the protection scope of the disclosure.

The invention claimed is:

1. A time-sensitive network switch, comprising a plurality of multi-core CPUs, is configured to:
   in response to receiving data through a physical transmission medium of the time-sensitive network switch, determine a target multi-core CPU in the plurality of multi-core CPUs;
   wherein, the target multi-core CPU is configured to:
      determine, in response to receiving the data, time-sensitive data and non-time-sensitive data from the data;
      determine a first buffer for storing the time-sensitive data and a second buffer for storing the non-time-sensitive data, in a cache resource pool of the time-sensitive network switch; and
      identify a priority of the time-sensitive data to allocate the time-sensitive data into a queue at a first port of the time-sensitive network switch to be waiting for transmission;
   wherein, the time-sensitive network switch further comprises a DMA controller, configured to output the non-time-sensitive data from a second port of the time-sensitive network switch by the DMA controller;
   wherein identifying the priority of the time-sensitive data to allocate the time-sensitive data into the queue at the first port of the time-sensitive network switch to be waiting for transmission comprises:
      according to the priority of the time-sensitive data, establishing a function library and a driver set to solve a port queue scheduling scheme for the time-sensitive data; and
      according to the port queue scheduling scheme, allocating the time-sensitive data into the queue at the first port of the time-sensitive network switch to be waiting for transmission.

2. The time-sensitive network switch according to claim 1, wherein, in response to receiving data through the physical medium of the time-sensitive network switch, determining the target multi-core CPU in the plurality of multi-core CPUs comprises:
   according to Quality of Service (QOS) requirements of the data and a configuration file defaulted by a user, determining the target multi-core CPU in the plurality of multi-core CPUs.

3. The time-sensitive network switch according to claim 1, wherein after identifying the priority of the time-sensitive data, the target multi-core CPU is further configured to:
   determine an idle core in the target multi-core CPU; and
   enable the idle core to process time-sensitive data with high priority to realize accelerated processing for the time-sensitive data with high priority.

4. The time-sensitive network switch according to claim 1, wherein, after receiving the data, and before determining the time-sensitive data and the non-time-sensitive data from the data, the target multi-core CPU is further configured to:
   verify for the received data;
   wherein, determining the time-sensitive data and non-time-sensitive data from the data comprises: determining the time-sensitive data and non-time-sensitive data from the data in response to a successful verification.

5. The time-sensitive network switch according to claim 1, wherein the DMA controller is configured to perform port-to-port pass-through transmission for the non-time-sensitive data.

6. The time-sensitive network switch according to claim 1, wherein the target multi-core CPU is further configured to:
monitor abnormal flows through ports and prevent abnormal data attacks at the ports.

7. The time-sensitive network switch according to claim 1, wherein each multi-core CPU is configured with L1 cache, L2 cache and SDRAM, wherein the L1 cache comprises an instruction cache area and a data cache area; the L2 cache is configured to cache data to be processed;
in response to determining that the first buffer for storing the time-sensitive data and the second buffer for storing the non-time-sensitive data cannot be determined in the cache resource pool, the target multi-core CPU is further configured to:
establish a third buffer for storing the time-sensitive data in the SDRAM;
establish a fourth buffer for storing the non-time-sensitive data in the SDRAM.

8. A time-sensitive network switch, comprising:
a plurality of multi-core CPUs;
a plurality of data traffic planes, wherein each data traffic plane comprises a DMA controller, a cache resource pool coupled with the DMA controller, and a plurality of physical transmission media coupled with the cache resource pool;
a data management plane, wherein the data management plane is configured to manage the plurality of data traffic planes;
an internal interconnect bus, wherein the data management plane and the plurality of data traffic planes are coupled with the plurality of multi-core CPUs through the internal interconnect bus;
wherein, in response to receiving data through a physical transmission medium, the time-sensitive network switch is configured to:
determine, by the internal interconnect bus, a target multi-core CPU for processing the data in the plurality of multi-core CPUs;
determine, by the target multi-core CPU, time-sensitive data and non-time-sensitive data from the data based on the data management plane;
determine, by the target multi-core CPU, a first buffer for storing the time-sensitive data and a second buffer for storing the non-time-sensitive data, in the cache resource pool based on the data management plane;
identify, by the target multi-core CPU, a priority of the time-sensitive data based on the data management plane, to allocate, through the data traffic plane corresponding to the physical transmission medium, the time-sensitive data into a queue at a first port of the time-sensitive network switch to be waiting for transmission; and
output, by the DMA controller in the data traffic plane corresponding to the physical transmission medium, the non-time sensitive data from a second port of the time sensitive network switch;
wherein identifying the priority of the time-sensitive data to allocate the time-sensitive data into the queue at the first port of the time-sensitive network switch to be waiting for transmission comprises:
according to the priority of the time-sensitive data, establishing a function library and a driver set to solve a port queue scheduling scheme for the time-sensitive data; and
according to the port queue scheduling scheme, allocating the time-sensitive data into the queue at the first port of the time-sensitive network switch to be waiting for transmission.

* * * * *